UNIVERSALLY ADAPTABLE TAPE PLAYER HAVING STEREO LOUDSPEAKERS

Filed Nov. 18, 1965

DAVID KRECHMAN
INVENTOR.

BY

Herzig, Walsh & Blackham
ATTORNEYS

United States Patent Office 3,405,944
Patented Oct. 15, 1968

3,405,944
UNIVERSALLY ADAPTABLE TAPE PLAYER HAVING STEREO LOUDSPEAKERS

David Krechman, 329 S. McCarty Drive,
Beverly Hills, Calif. 90212
Filed Nov. 18, 1965, Ser. No. 508,449
2 Claims. (Cl. 274—1)

ABSTRACT OF THE DISCLOSURE

The invention is an assembly of a sound reproducing unit, more particularly, a tape player having stereo loudspeakers assembled in a manner to facilitate the use of the unit in an automobile mounted on, or resting on the transmission in the front part of the automobile. The unit is further provided with means whereby it may be conveniently mounted on the automobile dashboard or carried about, that is, a handle is provided for ease of portability. Preferably, an adapter is provided so that the sound reproducing unit can be operated from the automobile battery or plugged into a conventional 110 volt source with an inverter providing an appropriate voltage output for operation of the unit.

This invention relates to music reproducing unit (i.e.) a tape player having stereo loudspeakers embodied therewith as a unit. The tape player itself may be one of known type which is battery operated, for example, by means of a twelve volt battery. The tape player has a self-contained battery, and is portable, a handle being provided so that it may be operated anywhere at any time. Additionally, however, plug-in connections are provided so that the tape player may be plugged into the cigaret lighter receptacle of an automobile so that the tape player may be operated from the automobile battery. Additionally, an adaptor may be provided having a plug-in receptacle so that the plug-in connector from the tape player may be plugged into the adaptor. The adaptor is a transformer and converter which may be plugged into an A.C. voltage supply such as a 110 volt source which is converted to a 12 volt D.C. supply for the tape player. The invention is described therein, in exemplary form as applied to a tape player, although it may be embodied in other forms of reproducing units.

The tape player and loudspeaker configuration form an assembly or unit particularly adapted for versatility in utilization. Preferably, the loudspeakers are attached to the sides of the tape player with the loudspeaker housings having portions below the level of the bottom of the tape player. The assembly has a manual carrying handle at the top. In this manner, the unit can be conveniently rested upon the transmission hump normally found in the floor of the front seat of an automobile. The unit rests securely on this hump with the tape player over the top of the hump and the loudspeakers engaging the sides thereof. The tape player can then be played using its own battery, or it can be plugged into the cigaret lighter receptacle of the automobile as pointed out in the foregoing. The carrying handle of the unit is at the top making the unit very conveniently portable. From the foregoing, it may be observed that the unit is very versatile from the standpoint of utilization. It may be used in an automobile as described or in a boat, or in any other convenient location. If no outside power supply source is available, the player may be operated from its own battery; otherwise, outside power sources may be utilized as described. There is thus provided a tape player unit that may be conveniently utilized in an office, at home, at the beach, or in an automobile, or boat while traveling, or engaging in recreation. The primary object of the invention is to make available a tape player assembly having the characteristics as described whereby maximum versatility as respects usage is realized.

Another object of the invention is to provide a tape player and stereo loudspeaker assembly as described, particularly adapted for portability and for use while resting on and held by the transmission hump normally found in the floor of the front seat of an automobile.

In a preferred form of the invention, the tape player has a bracket attached to the upper part thereof providing a carrying handle for conveniently transporting the assembly from one place to another. While using the unit in an automobile, sometimes it may be preferable not to rest the unit on the transmission hump, or the automobile may be one where no such hump is present. The unit embodies means for conveniently securing it to the lip at the lower part of the automobile dashboard. This means preferably, is in the form of hinged brackets attached to the carrying bracket at the top of the unit. These brackets are constructed so that the unit may be very easily and conveniently attached to and suspended from the inwardly extending lip or ledge normally found at the lower side of an automobile dashboard. The brackets embody thumbscrews whereby the unit can be very easily and conveniently attached and secured.

A further object of the invention is to provide this attaching or suspending means whereby, if desired, the unit may be suspended as described from the lower edge of the dashboard of an automobile or from other comparable structures.

Further objects and additional advantages of the invention will become apparent from the following detailed description and annexed drawings, wherein.

Referring now more particularly to the various figures of the drawings, the tape player is designated generally at 10. It may be of a known commercial type. In the form shown, it has a generally rectangular housing with a front panel having two parts formed at a slight angle to each other as designated at 12 and 14. On this front panel are control knobs as designated at 15, 16 and 17. Extending through slots 20 and 21 in the top surface of the player 10 are control levers as designated at 22 and 23 for operating the player.

Secured to the sides of the tape player 10 are rectangular stereo loudspeakers as designated at 27 and 28. Each of these loudspeaker units has an opening through which the sound is transmitted as designated at 30 covered by a fabric or screen as shown at 31 in FIG. 3. The loudspeaker units in the form of the invention shown are mounted at the sides of the tape player 10 so that their top surfaces are slightly below the top surface of the tape player 10, and they extend downwardly below the bottom level of the tape player 10 as may be seen in FIGS. 1 and 2. The size of the tape player 10 and the stereo loudspeakers 27 and 28 is such that in the configuration shown the assembly may be conveniently rested on the transmission hump normally found in the floor of an automobile, as shown at 35 in FIG. 2.

Figure 1:
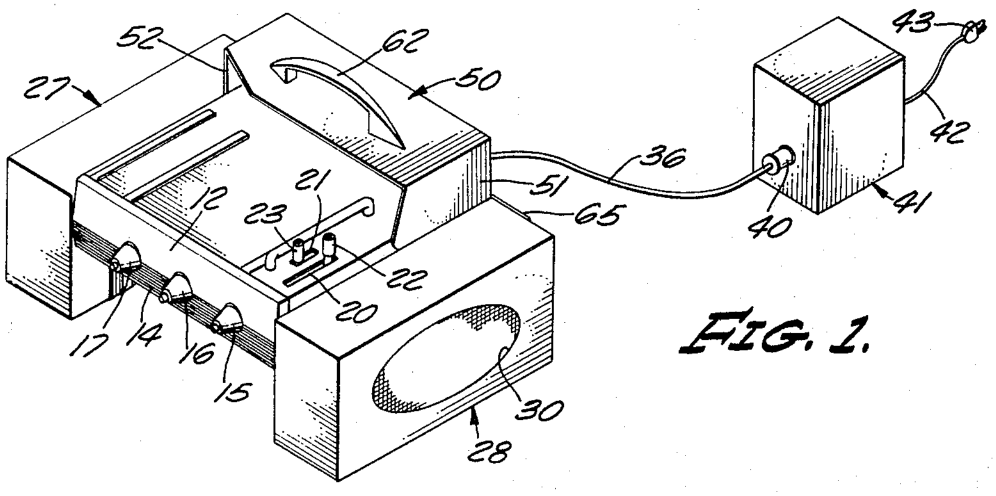
FIG. 1 is a perspective view of a preferred form of the invention shown with an adaptor unit.

The tape player preferably is of a type embodying a battery for drive which may be a 12 volt battery, thus makng it possible to operate the tape player anywhere where desired. Preferably, however, at the back of the unit there is provided a plug-in receptacle 37 adapted to receive a plug on the end of a plug-in cord 36, as shown in FIG. 1. This cord has has a plug 40 at the other end adapted to be received or plugged into a receptacle in an adaptor unit as designated at 41. The adaptor 41 is a transformer and/or converter having a cord 42 and plug 43 whereby it can be plugged into any domestic power supply such as a 110 volt source which is converted and transformed to 12 volts D.C. for operating the tape player 10 so that it may be operated in this manner whenever such domestic power supply is available.

Numeral 50 designates a rectangular bracket at the top of the tape player having legs 51 and 52 which may be attached by suitable means to the sides of the tape player 10. The bracket 50 also has a rear member 53 extending transversely as respects the bracket. In the form of tape player shown, the housing may be disassembled by means of removing screws as shown at 56 and 57 and 58 and 59. The support bracket 50 has an integral carrying handle as designated at 62.

Figures 2, 4:
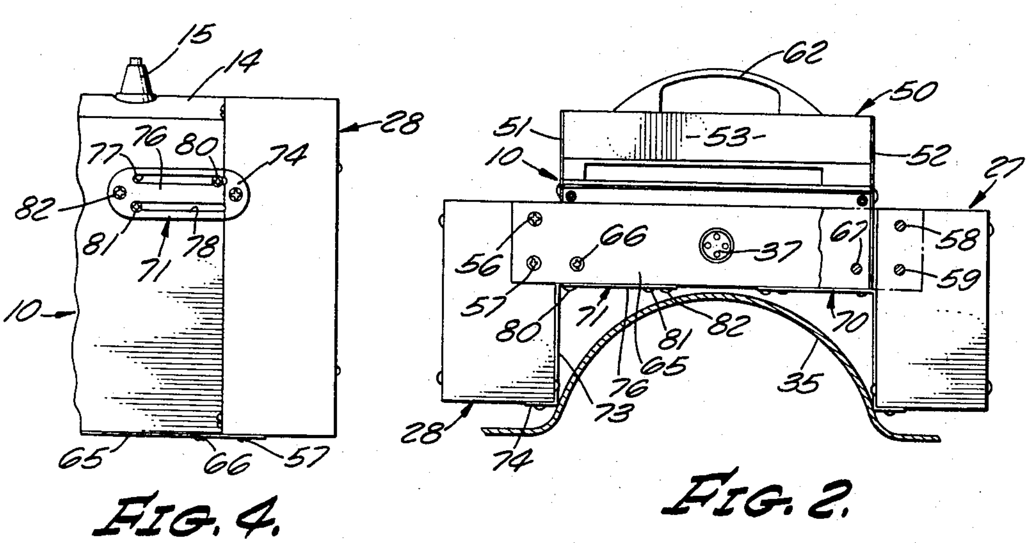
FIG. 2 is a back view of the unit shown resting on a transmission hump of an automobile.
FIG. 4 is a bottom view of a part of the unit.

FIGS. 2 and 4 show a preferred manner of attaching the stereo loudspeakers 27 and 28 to the tape player. Numeral 65 designates a plate at the back of the tape player unit having end parts overlapping ends of the tape player 27 and 28 and attached thereto by screws as shown at 66 and 67. The loudspeaker units may further be secured to the tape player by means of angular brackets as shown at 70 and 71; bracket 71 as shown in detail in FIG. 4 has a downwardly extending leg 73 havin a foot part 74. The leg is secured to the loudspeaker 28 by screws and the foot portion 74 is secured to the bottom of the loudspeaker unit 28 by a screw. The bracket 71 has a horizontal part 76 having slots as shown at 77 and 78 in FIG. 4. This leg of the bracket 71 is secured to the bottom of the tape player unit by screws 80 and 81 in the slots 77 and 78 and by a screw 82. The bracket 70 is secured in the same manner as the bracket 71.

Figure 3:
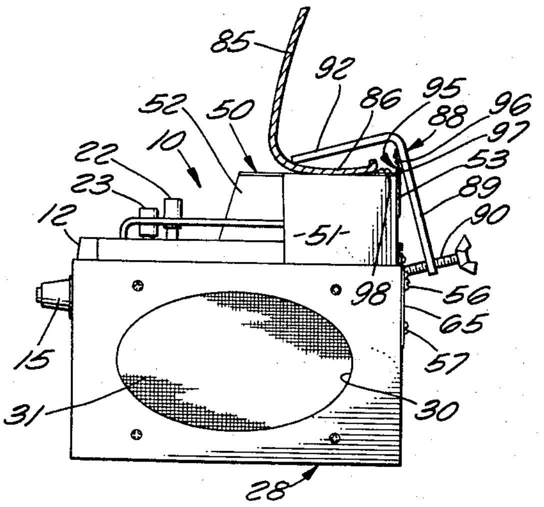
FIG. 3 is an end view of the unit showing the bracket suspension means.

Attaching means are additionally provided for suspending and securing the tape player assembly from the dashboard of an automobile or from other comparable structure having a lip or ledge. This manner of mounting is illustrated in FIG. 3. The dashboard of the automobile is designated at 85 having an inwardly directed lip 86. Bracket means are provided including preferably two individual angular brackets as designated at 88. Each of these brackets has a leg 89 including an adjustable thumbscrew 90 and a second angular leg 92. The brackets are hinged to the top of bracket 50 on the tape player. Numeral 95 designates a hinge having one leaf 96 secured to the leg 89 of bracket 88 by a screw. The hinge 95 has a hinge pin 97 and a second leaf 98 secured to the top of bracket 50 by a screw as shown. Thus, it may be seen that the angular bracket 81 is rotatable about the hinge pin 97 of the hinge 95. In use, the brackets 88 appear as illustrated in FIG. 3. The leg 92 is positioned over the lip 86 of the dashboard and the leg 89 and thumbscrew 90 are adjacent the back of the tape player assembly. By tightening up the thumbscrew 90, the bracket 88 is rotated in a counterclockwise direction so that the leg 92 of the bracket comes down into firm securing engagement with the lip 86. The two brackets operate similarly whereby the tape player and loudspeaker assembly can be very simply and easily attached to and supported from the lower edge of the dashboard of an automobile or from other comparable supports.

From the foregoing, those skilled in the art will observe that the invention as described herein achieves and realizes all of the objects and advantages as set forth in the foregoing as well as having many additional advantages that are apparent from the detailed description. The assembly provides a simplified and compact unit of tape player and stereo loudspeakers which is extremely versatile from the standpoint of usage. As explained in the foregoing, it can be conveniently utilized at any location such as at home, in the office, the beach, or while traveling in an automobile, boat or airplane. It is adapted to the various types of power supplies as described and adapted so as to be simply rested on the transmission hump of an automobile or supported by the bracket supports as described.

The foregoing disclosure is representative of a preferred form of the invention and is to be interpreted in an illustrative rather than a limiting sense, the invention to be accorded the full scope of the claims appended hereto.

I claim:

1. In combination, a portable reproducing means of the type adapted for battery operation or plug-in to a source of power, means comprising a pair of loudspeakers secured to the sides of the reproducing unit in a position such that the loudspeakers extend below the bottom surface of the reproducing unit, the spacing between the loudspeaker units being such that as to adapt the assembly to be supported and held on the transmission enclosing hump in the front seat of an automobile, supporting brackets for supporting the assembly from the bottom of an automobile dashboard, said brackets comprising angular members having hinges hinging them to a part of the reproducing unit, each of said brackets having an arm positioned to engage over the lip at the bottom of an automobile dashboard and another arm having a thumbscrew engageable with the back part of the said unit.

2. In combination, a portable reproducing means of the type adapted for battery operation or plug-in to a source of power, means comprising a pair of loudspeakers secured to the sides of the reproducing unit in a position such that the loudspeakers extend below the bottom surface of the reproducing unit, the spacing between the loudspeaker units being such as to adapt the assembly to be supported and held on the transmission enclosing hump in the front seat of an automobile, and a bracket comprising a transverse member having extending legs attached to the reproducing unit and having a manual carrying handle.

References Cited

UNITED STATES PATENTS

| | | | |
|---|---|---|---|
| 3,002,665 | 10/1961 | Allen | 224—42.42 |
| 3,058,749 | 10/1962 | Tourtellot | 274—10 |
| 3,311,276 | 3/1967 | Fromm | 224—42.11 X |

FOREIGN PATENTS

| | | |
|---|---|---|
| 1,138,249 | 10/1962 | Germany. |
| 1,107,961 | 5/1961 | Germany. |

HARRY N. HAROIAN, *Primary Examiner.*